United States Patent
Holmström et al.

(10) Patent No.: US 10,649,466 B2
(45) Date of Patent: May 12, 2020

(54) NAVIGATION FOR A VEHICLE BY IMPLEMENTING TWO OPERATING MODES

(71) Applicant: HUSQVARNA AB, Huskvarna (SE)

(72) Inventors: Jonathan Holmström, Bandhagen (SE); Peter Reigo, Djursholm (SE)

(73) Assignee: Husqvarna AB, Huskvarna (SE)

( * ) Notice: Subject to any disclaimer, the term of this patent is extended or adjusted under 35 U.S.C. 154(b) by 47 days.

(21) Appl. No.: 15/780,856

(22) PCT Filed: Dec. 2, 2015

(86) PCT No.: PCT/EP2015/078355
§ 371 (c)(1),
(2) Date: Jun. 1, 2018

(87) PCT Pub. No.: WO2017/092801
PCT Pub. Date: Jun. 8, 2017

(65) Prior Publication Data
US 2018/0364735 A1 Dec. 20, 2018

(51) Int. Cl.
*G05D 1/02* (2020.01)
*G01S 19/26* (2010.01)
(Continued)

(52) U.S. Cl.
CPC ............ *G05D 1/0278* (2013.01); *G01S 19/14* (2013.01); *G01S 19/26* (2013.01); *G01S 19/29* (2013.01);
(Continued)

(58) Field of Classification Search
CPC .............. G05D 1/0278; G05D 1/0088; G05D 2201/0208; G01S 19/14; G01S 19/26; G01S 19/29; G01S 19/44; G01S 19/48
(Continued)

(56) References Cited

U.S. PATENT DOCUMENTS

| 5,935,194 A | 8/1999 | Talbot et al. |
| 6,338,013 B1 | 1/2002 | Ruffner |

(Continued)

FOREIGN PATENT DOCUMENTS

| EP | 2 336 802 A1 | 6/2011 |
| EP | 2 541 203 A1 | 1/2013 |

(Continued)

OTHER PUBLICATIONS

Invitation to pay additional fees for International Application No. PCT/EP2015/078355 dated Aug. 25, 2016.
(Continued)

*Primary Examiner* — Gertrude Arthur Jeanglaude
(74) *Attorney, Agent, or Firm* — Burr & Forman LLP

(57) ABSTRACT

A robotic lawnmower (100) for movable operation within a work area (205) has a satellite navigation device (190), a landmark scanner (193) and a controller (110). The controller causes the robotic lawnmower (100) to movably operate within the work area (205) in a first operating mode, the first operating mode being based on positions determined from satellite signals received by the satellite navigation device (190). The controller determines that a position cannot be reliably determined based on satellite signals received by the satellite navigation device (190), and in response thereto causes the robotic lawnmower (100) to movably operate within the work area (205) in a second operating mode. In the second operating mode, the controller receives scanning information from said landmark scanner (193) and identifies at least one landmark based on the received scanning information and determines a landmark-based position estimate. The controller defines a search space using the landmark-based position estimate, and the satellite navigation device (190) is reconstructed based on the defined search space. Once the satellite navigation device (190) has been reconstructed, the controller causes the robotic lawnmower (100) to again operate in the first operating mode.

20 Claims, 4 Drawing Sheets

(51) Int. Cl.
  *G01S 19/48* (2010.01)
  *G01S 19/14* (2010.01)
  *G01S 19/29* (2010.01)
  *G01S 19/44* (2010.01)
  *G05D 1/00* (2006.01)

(52) U.S. Cl.
  CPC .............. *G01S 19/44* (2013.01); *G01S 19/48* (2013.01); *G05D 1/0088* (2013.01); *G05D 1/0246* (2013.01); *G05D 2201/0208* (2013.01)

(58) Field of Classification Search
  USPC .......................................................... 701/25
  See application file for complete search history.

(56) References Cited

U.S. PATENT DOCUMENTS

| 7,502,688 | B2 | 3/2009 | Hirokawa |
| 7,595,754 | B2 | 9/2009 | Mehta |
| 7,679,555 | B2 | 3/2010 | Dai et al. |
| 8,400,352 | B2 | 3/2013 | Fenton |
| 2004/0249504 | A1* | 12/2004 | Gutmann ............. G05D 1/0231 700/245 |
| 2007/0085737 | A1 | 4/2007 | Eslinger et al. |
| 2013/0245429 | A1* | 9/2013 | Zhang ................. A61B 6/5211 600/424 |
| 2017/0031360 | A1* | 2/2017 | Reigo .................... B60L 1/003 |

FOREIGN PATENT DOCUMENTS

| WO | 01/20260 | A1 | 3/2001 |
| WO | 2015/072897 | A1 | 5/2015 |

OTHER PUBLICATIONS

International Search Report and Written Opinion for International Application No. PCT/EP2015/078355 dated Oct. 17, 2016.
International Preliminary Report on Patentability for International Application No. PCT/EP2015/078355 dated Jun. 5, 2018.

* cited by examiner

NAVIGATION FOR A VEHICLE BY IMPLEMENTING TWO OPERATING MODES

TECHNICAL FIELD

This application relates to a robotic lawnmower, a robotic work tool system, a method and a computer-readable storage medium for improved navigation of a robotic lawnmower.

BACKGROUND

Conventional robotic lawnmowers usually operate within a work area in a garden by traversing the work area according to an irregular movement pattern. Such irregular movements will reduce the risk of tracks being formed in the lawn by the lawnmower as well as the risk of incomplete or unbalanced grass cutting attendance to the entire work area over time. For one common type of robotic lawnmowers, a boundary wire, or guide cable, is used to define the perimeter of the work area. By means of sensors in the robotic lawnmower, the lawnmower will detect when it approaches or crosses the boundary wire, and automatically change its propulsion direction so that the work area is not escaped and the lawnmower remains within the intended work area.

A garden may however be a challenging work area for a robotic lawnmower. A garden is generally of a small scale (under or around tens of meters) and may contain many kinds of obstacles such as, for instance, fountains, trees, bushes, ponds, deck chairs, benches, garden umbrellas (sunshades), statues, rocks, sheds, etc. The small scale and the presence of obstacles may make it hard for the robotic lawnmower to access all parts of the work area by its irregular movement pattern; difficult parts may for instance be where access is partially blocked by one or more obstacles, and/or by an obstacle near a boundary of the work area. The typical work area for a robotic lawnmower is thus heterogeneous and compact in nature, and may result in an insufficient grass-cutting work performance by the robotic lawnmower in the garden.

Some contemporary robotic lawnmowers employ satellite navigation to enhance the robotic lawnmower's ability for accurate navigation within the work area. As is well known per se, a satellite navigation or sat nav system is a system of satellites that provide autonomous geo-spatial positioning with global coverage. It allows small electronic receivers to determine their location (longitude, latitude, and altitude) to within a few metres, or even centimetres, using signals transmitted by radio from satellites. Receivers process the precise time as well as position and some systems also carrier phase, which can be used as a reference for scientific experiments. A satellite navigation system with global coverage may be termed a global navigation satellite system or GNSS (Global Navigation Satellite System).

Particularly good accuracy of GNSS systems is obtained by using one or more fixed, land-based reference receivers, or beacons, in addition to the satellites. This is called differential GNSS. There are several DGNSS techniques, such as the classical DGNSS (or DGPS), the Real Time Kinematics (RTK) and the Wide Area RTK (WARTK).

The use of GNSS systems requires good reception of satellite signals to work reliably. For a robotic lawnmower which employs satellite navigation, the heterogeneous and compact nature of the typical work area (i.e., the lawn in a garden) will pose an additional challenge. If the satellite signals become blocked by buildings, roofs, sheds, trees, garden umbrellas, awnings, foliage, etc, in or near the work area, the robotic lawnmower may lose track and be momentarily prevented from continuing with satellite navigation-based operation in the work area. For differential GNSS, the signal from a reference receiver or beacon may likewise be blocked by, for example, any of the obstacles mentioned above and/or by radio disturbances such as interference, multi-path propagation delay, etc.

If, because of a momentary situation as described above, the robotic lawnmower loses track of the GNSS signals and is therefore momentarily prevented from continuing with satellite navigation-based operation in the work area, several problems may arise.

First, if the robotic lawnmower has no other navigation means, it will have to suspend its current propulsion/movement and wait until the satellite navigation receiver again receives the satellite signals sufficiently well to recalibrate its current position and resume its movement and satellite navigation-based operation in the work area. It must be recalled that a robotic lawnmower is a device which operates autonomously without the direct assistance or control by a human user.

However, every time a robotic lawnmower is forced to repeatedly suspend its operation and stop its movement momentarily and then resume the operation and movement, the electrical motor and mechanical drive line will be subjected to a certain stress. If such stops occur frequently, which might be the case in a heterogeneous and compact garden, the accumulated wear and tear of critical parts of the robotic lawnmower will be considerable, and a premature breakdown of any of these critical parts is at risk.

Moreover, repeated stops and resumptions of the robotic lawnmower movement will consume a small but not negligible additional amount of electric power, hence causing a penalty in battery power consumption and reducing the maximum operational duration until next recharging of the battery.

Should the robotic lawnmower only stop and keep cutting the grass, this will lead to increased wear of the lawn and will lead to tracks or spots being formed leaving the lawn unevenly cut.

In addition, a repeated habit of intermittent stopping and restarting by the lawnmower may be interpreted by the garden owner as a potential malfunction. As a result, the garden owner may arrive at an ill-founded decision to take the lawnmower out of operation and seek professional service assistance or raise a warranty claim against the seller of the lawnmower. It goes without saying that a lawnmower which is taken out of operation will leave the lawn unattended to and thus provide insufficient grass-cutting work performance.

Furthermore, especially when using lowcost GPS systems (such as single channel DGPS/RTK for example) the time to again acquire a fix on the satellite(s) can take a long time (up to around 20 minutes). This will waste operating time when the robotic work tool is possibly standing still trying to acquire a fix on the satellites. It also reduces the trust that a user has in this system as he will often see the robotic work tool simply stop for no apparent reason.

Furthermore, the loss of a fixation of the satellite(s) also mean that the system is vulnerable to interference and there is a great risk of determining erroneous positions due to so called position jumps.

In view of the problems and shortcomings indicated above, there is a need for an improved manner of operation for a robotic lawnmower in a heterogeneous and compact work area.

The same or similar problems also exist for other robotic work tools. There is thus a need for an improved manner of operation for a robotic work tool in a heterogeneous and compact work area.

In fact, the same or similar problems also exist for other guided vehicles, such as autonomous farming equipment for example. There is thus a need for an improved manner of operation for a guided vehicle.

SUMMARY

The inventors of the present invention have realized, after inventive and insightful reasoning that it will not be necessary to stop an ongoing movement or propulsion of a robotic work tool, such as a lawnmower, or other guided vehicle when its satellite navigation device loses track of the satellite signals, or when the signal quality deteriorates, and needs recalibration. Instead, the robotic work tool can continue to be movably operated based on a deduced reckoning navigation sensor, and also on landmarks that are scanned in the environment to provide a position for navigation. The robotic work tool may reduce the search space when re-constructing the satellite based position by scanning for at least one landmark and, based on a position of said at least one landmark determine a position for the robotic work tool. The position may be used alone or in combination with other position assisting means to reduce the search space and may be used to shorten the time for recalibration of the satellite navigation device, thereby allowing the robotic work tool to quickly regain track of the satellite signals and resume its satellite signal-based operation.

It is therefore an object of the teachings of this application to overcome one or more of the problems and shortcomings listed above by providing a robotic work tool for movable operation within a work area. The robotic lawnmower comprises a satellite navigation device, landmark scanner and a controller. The controller is configured to cause the robotic lawnmower to movably operate possibly within the work area in a first operating mode, the first operating mode being based on positions determined from satellite signals received by the satellite navigation device, determine that a position cannot be reliably determined based on satellite signals received by the satellite navigation device, and in response thereto cause the robotic lawnmower to movably operate within the work area in a second operating mode. In the second operating mode, the controller is configured to receive scanning information from said landmark scanner, identify at least one landmark based on the received scanning information, determine a landmark-based position estimate, define a search space using the landmark-based position estimate, reconstruct the work point for the satellite navigation device based on the defined search space. In one embodiment the controller is further configured to cause the robotic lawnmower to again operate in the first operating mode once the work point for the satellite navigation device has been reconstructed.

In one embodiment the vehicle is a robotic work tool.

In one such embodiment the robotic work tool is a robotic lawnmower.

In another such embodiment, the robotic work tool is a golf ball retrieving robot, snow clearing robot, robotic leaf collector, line painter or plot brusher.

In one embodiment the vehicle is a guided vehicle, being an autonomously controlled vehicle or a user controlled vehicle. Examples of guided vehicles are tractors, harvesters, drones.

It should be noted that the vehicle may be configured to operate in the first mode simultaneously as in the second mode, wherein the second mode then serves to maintain a good satellite reception or to proactively determine search spaces to be used, should the signal quality of the satellite signals deteriorate. It is also an object of the teachings of this application to overcome one or more of the problems and shortcomings listed above by providing a robotic work tool system comprising a charging station and a robotic lawnmower according to the above.

It is a further object of the teachings of this application to overcome one or more of the problems and shortcomings listed above by providing a method of controlling a robotic lawnmower for movable operation possibly within a work area. The method comprises movably operating the robotic lawnmower within the work area in a first operating mode, the first operating mode being based on positions determined from satellite signals received by a satellite navigation device, determining that a position cannot be reliably determined based on satellite signals received by the satellite navigation device, and, in response thereto, movably operating the robotic lawnmower within the work area. In the second operating mode, the method comprises receiving scanning information from said landmark scanner, identify at least one landmark based on the received scanning information, determine a landmark-based position estimate, define a search space using the landmark-based position estimate, recalibrating the satellite navigation device based on the defined search space, and, in one embodiment, once the work space for the satellite navigation device has been reconstructed, again operating the robotic lawnmower in the first operating mode.

It is moreover an object of the teachings of this application to overcome one or more of the problems and shortcomings listed above by providing a computer readable storage medium encoded with instructions that, when executed on a processor, perform the method referred to above.

Using the teachings herein, a robotic work tool such as a robotic lawnmower is thus provided which does not stop or discontinue its operation as it loses satellite reception at least not for a long time. Furthermore, as the inventors have realized that for a robotic lawnmower operating in a garden, a minor deviation from an expected trajectory will most likely not have catastrophic consequences and an unsupervised continued operation relying on deduced reckoning may thus be used. The robotic lawnmower may thus be arranged to continue operation according to the objects above thereby solving the problems for example listed in the background section.

It should be noted that although the teachings herein will be given with reference to a robotic lawnmower, being one example of a robotic work tool, the teachings may also be applied to other vehicles being guided by a GNSS device, both autonomously controlled or user controlled. Examples of such guided vehicles are various farming vehicles (tractors, harvesters for example), drones, cars, trucks, airplanes, to mention a few examples.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art Like numbers refer to like elements throughout.

Figure 1:
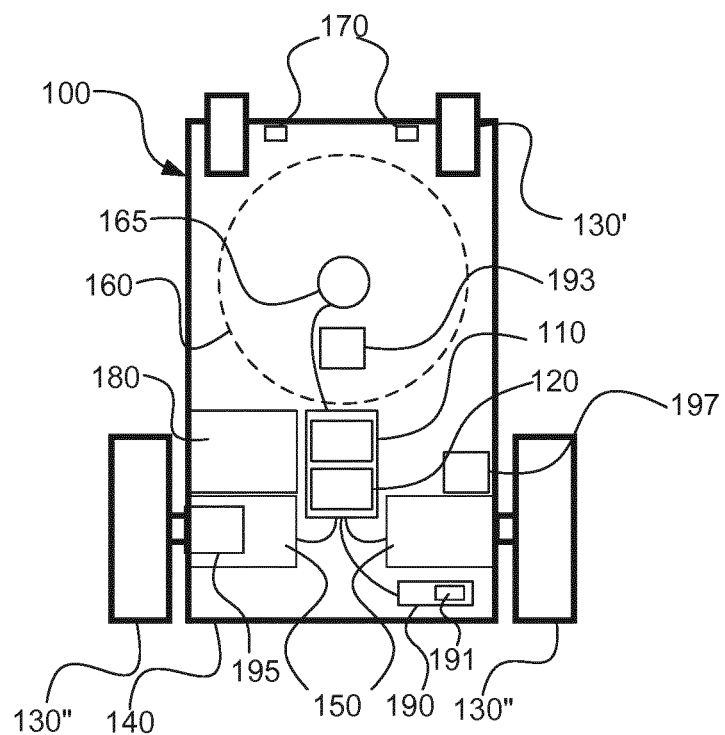
FIG. 1 shows a schematic overview of a robotic lawnmower according to one embodiment of the teachings of this application.

FIG. 1 shows a schematic overview of a robotic work tool such as a robotic lawnmower 100, being an example of a vehicle, having a body 140 and a plurality of wheels 130. In the exemplary embodiment of FIG. 1 the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are two sensors 170, arranged to detect a magnetic field (not shown). If present, the sensors 170 will be connected to the controller 110, and the controller 110 will be configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic lawnmower 100 is close to or crossing a boundary wire, or inside or outside an area enclosed by the boundary wire.

The robotic lawnmower 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 is also arranged with a satellite navigation device 190 which comprises a satellite signal receiver 191. In the disclosed embodiment, the satellite signal receiver 191 is a GNSS (Global Navigation Satellite System) satellite signal receiver, such as a GPS (Global Positioning System) satellite signal receiver. The satellite navigation device 190 is connected to the controller 110 for enabling the controller 110 to determine current positions for the robotic lawnmower 100 using the satellite navigation device 190 and to control the movements of the robotic lawnmower 100 based on the determined positions.

The robotic lawnmower 100 further comprises a landmark scanner 193. The landmark scanner may be any device arranged to scan a surrounding and generate and provide scanning information from which an object may be identified. Whether the object is identified by a processor of the landmark scanner or by another processor, such as in an accompanying device or by the controller of the robotic work tool, will not be differentiated between herein but all such identification will be determined to have been made by the controller, the controller possibly comprising more than one processor. The landmark scanner thus provides scanning information to the controller which is configured to detect at least one object in said scanning information. The object may then be identified as a landmark by the controller. The landmark scanner 193 may be movably arranged on the robotic lawnmower 100 so that it may scan in different directions than the direction currently travelled in. Alternatively, the landmark scanner may comprise several scanners directed at different directions.

The landmark scanner may be a camera, a radar, a sonar, a laser scanner, an infrared scanner, 3D sensor, (ultra) sound sensors, (Ultra Wide Band) radio sensors to name a few examples.

The landmark scanner may thus be a sensor of some sort and the scanning information is then comprised of sensor or sampling information.

The robotic lawnmower 100 may further comprises at least one deduced reckoning navigation sensor 195 for providing signals for deduced reckoning navigation, also referred to as dead reckoning. Examples of such deduced reckoning navigation sensor(s) 195 are odometers and compasses.

The robotic lawnmower 100 may further be arranged with a wireless communication interface 197 for communicating with other devices, such as reference stations, beacons, a server, a personal computer or smartphone, or the charging station. Examples of such wireless communication devices are Bluetooth™, Global System Mobile (GSM) and LTE (Long Term Evolution), ISM radios, to name a few.

In addition, the robotic lawnmower 100 may be arranged with collision sensor means for detecting when the robotic lawnmower 100 runs into an obstacle. The collision sensor means may be one or more separate sensors (such as accelerometers, pressure sensors or proximity sensors) arranged in or on the housing of the robotic lawnmower 100 and capable of detecting an impact caused by a collision between the robotic lawnmower 100 and an obstacle. Alternatively, the collision sensor means may be implemented as a program routine run by the controller 110, being effective to detect a sudden decrease of the rotational speed of any of the drive wheels 130" and/or sudden increase in the drive current to the electric motor 150.

Figure 2:
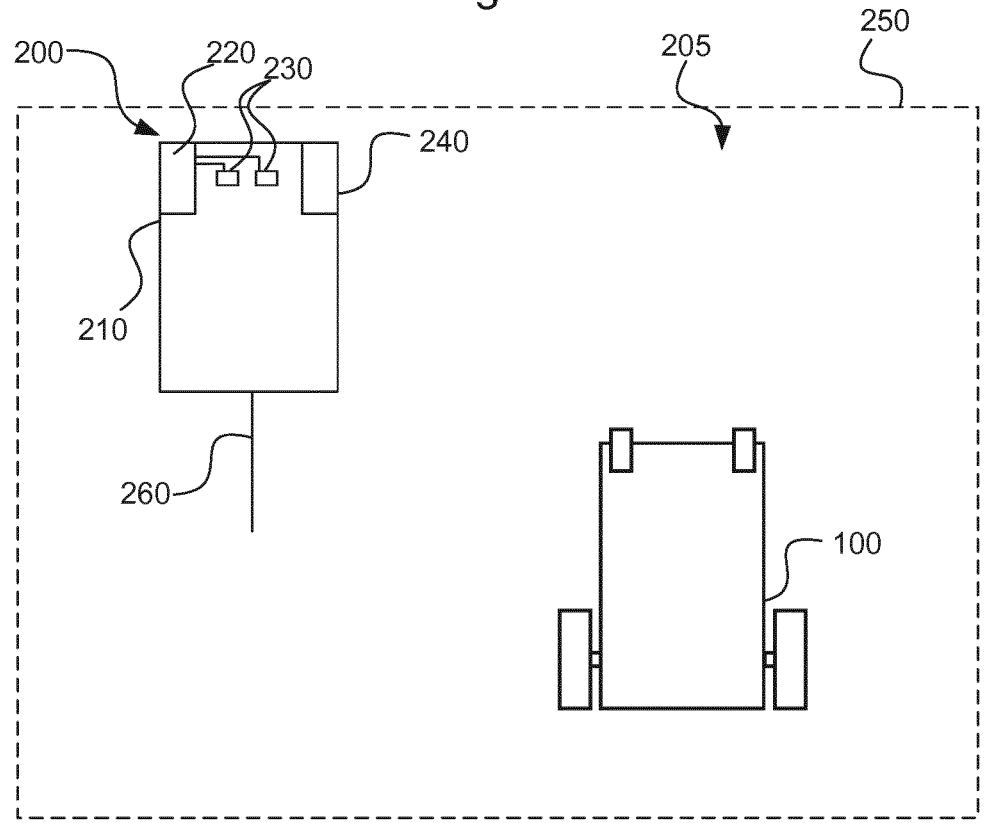
FIG. 2 shows a schematic view of a robotic working tool system with a robotic lawnmower according to one embodiment of the teachings of this application.

FIG. 2 shows a schematic view of a robotic lawnmower system 200 in one embodiment. The schematic view is not to scale. The robotic lawnmower system 200 comprises a charging station 210 and a boundary 250 arranged to enclose a work area 205, in which the robotic lawnmower 100 is supposed to serve. The robotic lawnmower 100 uses the satellite navigation device 190 to remain within the work area 205 by comparing the successive determined positions of the robotic lawnmower 100 against a set of geographical coordinates defining the boundary 250 of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic lawnmower 100 will detect. As the robotic lawnmower 100 (or more accurately, the sensor 170) crosses the boundary wire 250 the direction of the magnetic field will change. The robotic lawnmower 100 will thus be able to determine that the boundary wire has been crossed, and take appropriate action by controlling the driving of the rear wheels 130" to cause the robotic lawnmower 100 to turn a certain angular amount and return into the work area 205. For its operation within the work area 205, in the embodiment of FIG. 2A, the robotic lawnmower 100 mainly uses the satellite navigation device 190, supported by the deduced reckoning navigation sensor 195 as will be described in some more detail further below.

The use of more than one sensor 170 enables the controller 110 of the robotic lawnmower 100 to determine how the robotic lawnmower 100 is aligned with relation to the boundary wire 250 (if such is used) by comparing the sensor signals received from each sensor 170. This enables the robotic lawnmower to follow the boundary wire 250, for example when returning to the charging station 210 for charging. Optionally, the charging station 210 may have a guide cable 260 for enabling the robotic lawnmower to find the entrance of the charging station 210. In one embodiment the guide cable 260 is formed by a loop of the boundary wire 250. In one embodiment the guide wire 260 is used to generate a magnetic field for enabling the robotic lawnmower 100 to find the charging station without following a guide cable 260.

Figure 3:
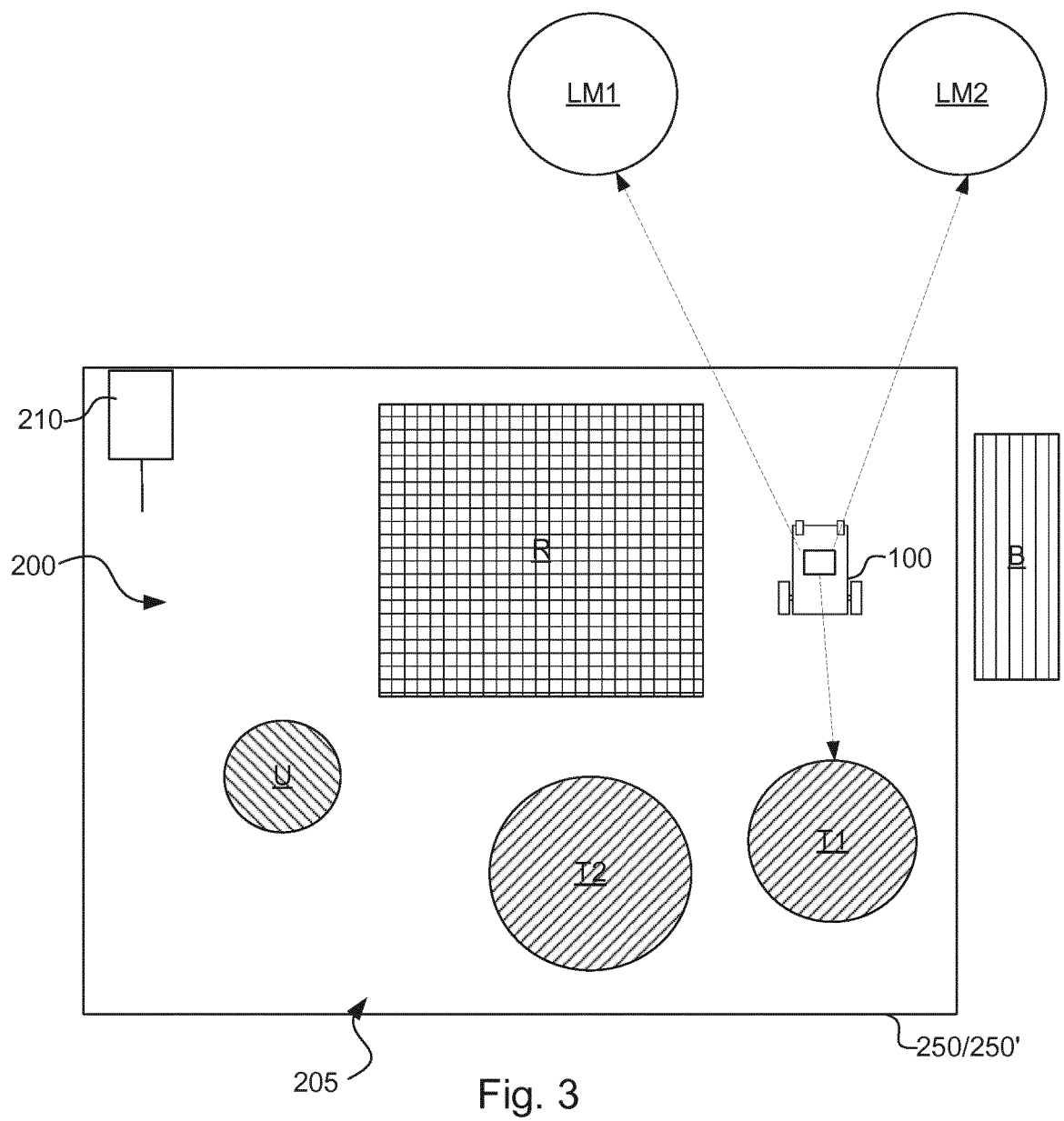
FIG. 3 shows a schematic view of a robotic working tool system in operation in a heterogeneous and compact work area according to one embodiment of the teachings of this application.

FIG. 3 shows a schematic view of a robotic lawnmower system 200 where a problem with the prior art is illustrated. The schematic view is not to scale. Depicted is a schematic garden surrounding a house or other building. The garden has a lawn, the cutting of which is to be attended to by the robotic lawnmower system 200. The roof R of this house or building may block the satellite signals when the robotic lawnmower 100 is nearby, thereby preventing the satellite signal receiver 191 in the satellite navigation device 190 from receiving satellite signals in sufficient numbers or quality to reliably determine, by the controller 110, a current position of the robotic lawnmower 100.

Furthermore, first and second trees T1 and T2 may similarly cause momentary blocking of satellite signals, and so may a garden umbrella U, depending on the momentary location of the robotic lawnmower 100 within the work area 205. Also, a building B nearby may cause momentary satellite signal blocking when the robotic lawnmower is close to that building.

As a result of such momentary satellite signal blocking caused by obstacles R, T1, T2, U and B in or near the heterogeneous work area 250, the satellite navigation device 190 and controller 110 of the robotic lawnmower 100 will lose track and be momentarily prevented from continuing with satellite navigation-based operation in the work area 250.

The satellite signal-blocking obstacles R, T1, T2, U and B in FIG. 3 are merely examples; various other types of obstacles may cause similar problems, including but not limited to sheds, rocks, trees, awnings, foliage, etc, in or near the work area 250.

Also shown in FIG. 3 are two landmarks LM1 and LM2, that may be scanned (as indicated by the dashed arrows) by the landmark scanner 193. As is indicated in FIG. 3, an object or structure in the work area 205 may be used as a landmark, such as the tree T1. It should be noted that although only two landmarks (three including the tree T1) is shown, any number or types of landmarks may be used in an area. Examples of other types of, apart from visual, landmarks are radio beacons, light beacons, sound beacons, magnetic beacons to name a few examples.

Figure 4:
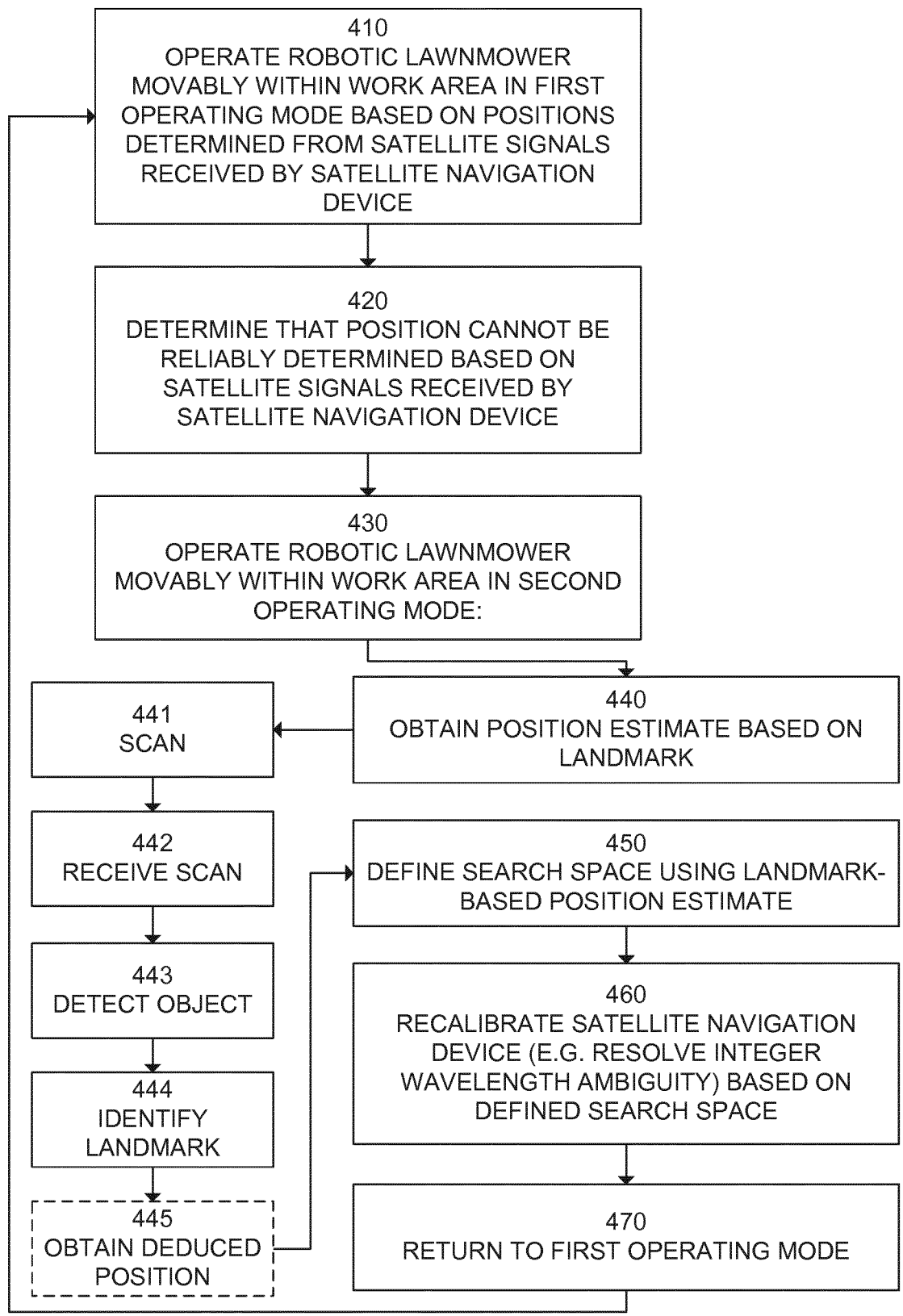
FIG. 4 shows a flowchart for a general method of controlling a robotic lawnmower for movable operation within a work area, according to the teachings herein.

FIG. 4 shows a flowchart for a general method of operating the robotic lawnmower 100 in a manner which solves, eliminates or at least mitigates the problems and shortcomings associated with the prior art. Generally speaking, the method in FIG. 4 is based on the inventive understanding that for situations when the robotic lawnmower 100 is momentarily prevented from continuing with satellite navigation-based operation in the work area 250 because of a momentary loss of track of the satellite signals, instead of stopping the robotic lawnmower 100 to a halt and waiting for a long time until the satellite signals can be tracked again, the movement or propulsion of the robotic lawnmower 100 continues possibly based on deduced reckoning navigation or other navigation method. It also allows for a faster and more precise fixation of the satellites thereby reducing the risk of erroneous positions to be determined.

The time it takes for the robotic lawnmower 100 to reconstruct the work point (including the time and phase of the satellites to track) and find track of the satellite signals again is reduced by defining a search space which is based on a position estimate based on scanned landmarks and which is therefore more accurate and limited than a corresponding search space that would have been based solely on the last known position obtained from the satellite signals. It is thus made possible for the robotic lawnmower 100 to quickly regain track of the satellite signals. As a result, the problems and shortcomings associated with repeated halts and restarting of lawnmower movement or propulsion, as were referred to in detail in the Background section, can be solved, eliminated or at least mitigated.

The method shown in FIG. 4 will now be described in more detail.

In a first step 410, the controller 110 is configured to cause the robotic lawnmower 100 to movably operate within the work area 205 in a first operating mode. The first operating mode is based on positions determined from satellite signals received by the satellite navigation device 190. The robotic lawnmower 100 is thus configured to utilize its satellite navigation device 190 to control its working operation. In one embodiment, the controller 110 determines a mowing pattern based on one or more positions of the robotic lawnmower 100. The mowing pattern may be determined as a direction or heading to be taken, or a circular pattern or other mowing pattern. Such mowing patterns are known to a skilled person and will not be discussed further herein.

Alternatively or additionally, the mowing pattern may be based on a digital or virtual map of the work area 205. To this end, the controller may be configured to store a map of the work area in the memory 120. The map may be a collection of geographical positions, for example indicating the boundaries of the work area 205, or it may be a more detailed virtual or digital map containing for instance information also about the location of the charging station 210, and/or about forbidden subareas (e.g. known obstacles) in the work area 205.

The map may have been configured by the user (e.g. the garden owner) upon installation or subsequent update of the robotic lawnmower system 200 by using a remote computer device, wherein the contents of the map may have been downloaded to the robotic lawnmower 100 over the wireless communication interface 197.

In one embodiment, the controller 110 may be configured to generate or update a map of the work area 205 on the fly as the robotic lawnmower 100 operates. For instance, obstacles in the work area 205 as detected by the aforementioned collision sensor means may be translated into small regions of the map where the work area 205 shall be avoided by the robotic lawnmower 100, whereas the boundary 205 of the work area 250 as detected by the magnetic sensors 170 may be translated into regions of the map which define the limits of the work area 205, etc.

In a second step 420, the controller 110 is configured to determine that a position of the robotic lawnmower 100 cannot currently be reliably determined based on satellite signals received by the satellite navigation device 190. It should be noted that the number of satellite signals needed to reliably determine the position of the robotic lawnmower 100 may differ between different satellite signal receivers 191, as well as on the operation and safety issues of the robotic lawnmower 100. For example, if only the position is of interest, it may suffice to receive three reliable satellite signals to establish a reliable position, whereas if, for example, the amplitude or time is also of relevance, a fourth satellite signal may need to be reliably received.

In response to having determined in step 420 that a position of the robotic lawnmower 100 cannot currently be reliably determined based on satellite signals, the controller 110 causes in a third step 430 the robotic lawnmower 100 to movably operate within the work area 205 in a second, less accurate, operating mode. Hence, the movement or propulsion of the robotic lawnmower 100 is possibly not stopped when the mode changes from the first operating mode to the second operating mode, instead it continues to be movably operable by means of the electric motor 150 continuing with the propulsion of the drive wheels 130", the robotic lawnmower 100 thereby continuing to move in the work area 205.

In the second operating mode, the deduced reckoning navigation sensor 195 could be used to maintain an minimum level of position accuracy while swiftly reconstructing the lost GNSS track. The deduced reckoning navigation sensor 195 may be adapted for detecting one or more of the following navigation parameters: position, speed, direction, tilt angle, and acceleration. For instance, the deduced reckoning navigation sensor 195 may comprise an odometer, a compass or an accelerometer.

Other alternative manners of maneuvering are also possible, especially for other types of vehicles, such as manual control, wired control, or other variations possibly including optical navigation using the landmark scanner 193, deduced reckoning being only an example of a navigation method that could be used.

As is well known per se, deduced reckoning (or dead reckoning) works so that the last known direction of the robotic lawnmower 100 is taken to be the current and assumed direction. By, for example, measuring the number of wheel turns (or rather the turn speed of the wheel axle and the elapsed time), a current position estimate can be determined. If the robotic lawnmower 100 encounters the boundary 250/250', the controller 110 may cause it to turn, and by counting the number of wheel turns, the new direction can be determined. The controller 110 may thus control the operation of the robotic lawnmower 100 based on position estimates made available from the deduced reckoning.

While in the second operating mode, the controller 110 will attempt to reconstruct the work space reconstruct the satellite navigation device 190 to regain track of the satellite signals, so as to allow re-entry into the first operating mode when a reliable position can again be reliably determined based on satellite signals received by the satellite navigation device 190. The recalibration procedure generally involves the following steps.

In a fourth step 440, the controller 110 may use the landmark scanner 193 to scan 441 for landmarks LM1, LM2. The controller thus receives 442 scanning information from the landmark scanner 193 and detects 443 at least one object in the scanning information. The object is then matched 444 with objects in a landmark database or a map, for identifying a landmark. Based on the landmark a landmark-based position estimate is obtained. The landmark data base may be stored internally in memory 120 or it may be stored externally, possibly queried through the communication interface 195.

The landmark database may be configured to store only landmarks for an area close to the working area to reduce the needed space to store the database. Should the robotic lawnmower be moved to a new position, or travel out of a covered area, new entries for the landmark database may be downloaded or otherwise stored in the landmark database.

The landmark-based position estimate may be determined based on a triangulation of at least three identified landmarks.

The landmark-based position estimate may alternatively be determined based on a determined distance to the landmark, the distance possible being part of the scanning information, such as a focus distance, possibly in combination with a direction of the landmark scanner 193, the direction also possible being part of the scanning information.

In one embodiment the working area is divided into working cells, each cell being characterized by landmark values, such as distance to an object, objects recognized by pattern recognition, magnetic fields and so on. As a cell has been identified, the robotic work tool can determine which satellites to search for, the cell being associated at a given time with a set of satellites.

In a fifth step 450, the controller 110 defines a search space using the landmark-based position estimate.

Alternatively, the controller 11 may also use the deduced reckoning navigation sensor 195 to obtain 445 a deduced reckoning position estimate which the landmark-based position estimate may also be based on. This is optional as is indicated by the dashed box.

The defined search space is used in a sixth step 460 for recalibrating the satellite navigation device 190. Finally, once the satellite navigation device 190 has been reconstructed in step 460, the controller 110 causes in a seventh step 470 the robotic lawnmower 100 to again operate in the first operating mode.

In one advantageous embodiment, the satellite navigation device 190 is a Global Navigation Satellite System device, such as a Global Positioning System device, and comprises a single-frequency carrier phase differential satellite signal receiver 191. The carrier phase differential satellite signal receiver 191 will support very accurate navigation for the robotic lawnmower 100 with precision of the order of centimetres in the positions obtainable by the satellite navigation device 190. This is particularly advantageous for a heterogeneous and compact work area 205 in the form of a typical garden.

The single-frequency carrier phase differential satellite signal receiver 191 will provide a benefit in terms of component cost efficiency, since a single-frequency carrier phase differential satellite signal receiver is much less expensive than a dual-frequency carrier phase differential satellite signal receiver. It is a general objective in the field of robotic lawnmowers to facilitate a cost-efficient component choice.

For this advantageous embodiment, the recalibration step 460 for the satellite navigation device 190 involves resolving an integer number-of-wavelength ambiguity for satellite signals received by the satellite navigation device 190. Since the satellite navigation device 190 lost track of the satellite signals in the preceding step 420, the satellite navigation device 190 needs to determine the distances to the satellites in order to regain accurate position determination based on the satellite signals. In order to do this, the satellite navigation device 190 needs to know the exact number of integer wavelengths to a certain satellite when the tracking of the satellite signal from that satellite starts. A priori, the exact number of integer wavelengths is not known, i.e. there is initially an integer wavelength ambiguity that needs to be resolved. When the integer wavelength ambiguity has been resolved, the single-frequency carrier phase differential satellite signal receiver 191 can then accurately track phase changes in the received satellite signal.

For a single-frequency carrier phase differential satellite signal receiver, a coarse search space for the integer wavelength ambiguity resolution can be established based on an estimated starting position derived from a pseudo code in the received satellite signal. However, the precision of the estimated starting position will be rather poor, typically ±1 m. For a satellite signal wavelength at 19 cm or 24 cm (1575 MHz and 1228 MHz), this will mean that there are 10 possible integer wavelength solutions for each satellite. With 10 available satellites, the total number of possible integer wavelength solutions will amount to $10^{10}$. To resolve an ambiguity among $10^{10}$ different solutions will take considerable time, typically of the order of 10 minutes. A ten-minute recalibration time is clearly improper for a robotic lawnmower.

The disclosed embodiment provides a substantial improvement to this situation by making use of the landmark-based position estimate obtained via the landmark scanner 193 (possibly in combination with the deduced reckoning position estimate obtained from the deduced reckoning navigation device 195) when defining the search space for the integer wavelength ambiguity resolution. The search space obtained in this way will be substantially smaller than the coarse search space derived from the pseudo code in the received satellite signal. For instance, when the landmark-based position estimate has as precision of ±15 cm and the satellite signal wavelength is 19 cm, this will mean that there are only 3 possible integer wavelength solutions for each satellite. With 10 available satellites, the total number of possible integer wavelength solutions will amount to $10^3$. To resolve an ambiguity among $10^3$ different solutions can be made quite quickly, typically of the order of 1-10 seconds. Such a short recalibration time is satisfactory for a robotic lawnmower, and a considerable reduction in the recalibration time has therefore been achieved.

As a result, therefore, it will not be necessary to stop the movement or propulsion of the robotic lawnmower 100 when the satellite navigation device 190 loses track of the satellite signals and needs recalibration; instead the robotic lawnmower 100 can be movably operated in the second operating mode perhaps based on the deduced reckoning navigation sensor 195, wherein a landmark-based position estimate obtained by the landmark-based scanner 193 may be used to shorten the time for recalibration of the satellite navigation device 190.

In the light of the inventive understandings above, in one refined embodiment the controller 110 is therefore configured, in the second operating mode, to define the search space for recalibration of the satellite navigation device 190 by first obtaining a pseudo range position estimate from satellite signals received by the satellite navigation device 190, then determining a coarse search space candidate from the pseudo range position estimate, and finally defining the search space by reducing a scope of the coarse search space candidate based on the deduced reckoning position estimate.

In another refined embodiment of the robotic lawnmower, the controller 110 is configured, in the second operating mode, to estimate whether the defined search space will allow integer wavelength ambiguity resolution within a threshold time, and, if so, continue in the second operation mode at least for the duration of the threshold time. Otherwise, the controller 110 will stop an ongoing propulsion of the robotic lawnmower 100.

In still another refined embodiment of the robotic lawnmower, the controller 110 is configured, in the second operating mode, to measure a duration of the second operation mode, determine whether a threshold time has been exceeded, and, if so, stop an ongoing propulsion of the robotic lawnmower 100.

Each of the latter two of these refined embodiments will be particularly suitable to serve a work area where it is not desired to let the robotic lawnmower 100 operate movably too long without satellite navigation. Such a work area may, for instance, be a garden containing fragile objects for which it is desired to avoid collision to a large extent. Still, thanks to the reduced recalibration time for the satellite navigation device 190, the robotic lawnmower 100 will often be capable of switching seamlessly between the first and second operation modes, since the recalibration time will not exceed the threshold time. The threshold time may therefore be set to a value which slightly exceed the normal reduced recalibration time as provided for by the present invention.

It should be noted that the two operating modes need not be exclusive but the robotic work tool may operate in both the first operating mode, primarily relying on satellite navigation and at the same time operating in the second mode for detecting landmarks to be used for maintaining the satellite signal quality, or for proactively defining search spaces to be used, should the signal quality deteriorate whereby a new satellite set may be searched for prior to losing reliable satellite reception.

Figure 5:
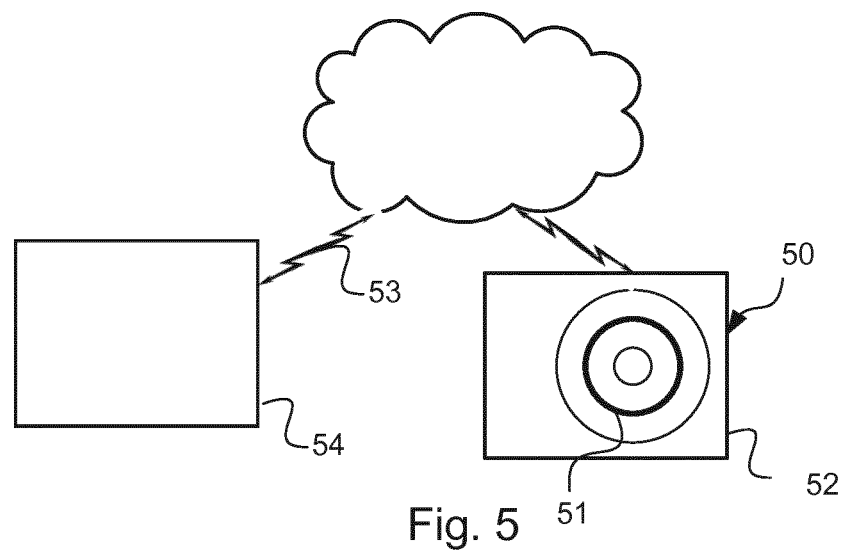
FIG. 5 shows a schematic view of a computer-readable medium according to the teachings herein.

FIG. 5 shows a schematic view of a computer-readable medium as described in the above. The computer-readable medium 50 is in this embodiment a data disc 50. In one embodiment the data disc 50 is a magnetic data storage disc. The data disc 50 is configured to carry instructions 51 that when loaded into a controller, such as a processor, execute a method or procedure according to the embodiments disclosed above. The data disc 50 is arranged to be connected to or within and read by a reading device 52, for loading the instructions into the controller. One such example of a reading device 52 in combination with one (or several) data disc(s) 50 is a hard drive. It should be noted that the computer-readable medium can also be other mediums such as compact discs, digital video discs, flash memories or other memory technologies commonly used. In such an embodiment the data disc 50 is one type of a tangible computer-readable medium 50.

The instructions 51 may also be downloaded to a computer data reading device 54, such as the controller 110 or other device capable of reading computer coded data on a computer-readable medium, by comprising the instructions 51 in a computer-readable signal 53 which is transmitted via a wireless (or wired) interface (for example via the Internet) to the computer data reading device 54 for loading the instructions 51 into a controller. In such an embodiment the computer-readable signal 53 is one type of a non-tangible computer-readable medium 50.

The instructions may be stored in a memory (not shown explicitly in FIG. 5, but referenced 120 in FIG. 1) of the computer data reading device 54.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

It should be noted that although the teachings herein have been given with reference to a robotic lawnmower, being one example of a robotic work tool, the teachings may also be applied to other vehicles being guided by a GNSS device, both autonomously controlled or user controlled. Examples of such guided vehicles are various farming vehicles (tractors, harvesters for example), drones, cars, trucks, airplanes, to mention a few examples.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A vehicle for movable operation, the vehicle comprising:
   a satellite navigation device;
   a landmark scanner; and
   a controller, the controller being configured to:
      cause the vehicle to movably operate in a first operating mode, the first operating mode being based on positions determined from satellite signals received by the satellite navigation device;
      determine that a position cannot be reliably determined based on satellite signals received by the satellite navigation device, and, in response thereto, cause the vehicle to movably operate in a second operating mode;
   wherein in the second operating mode, the controller is configured to:
      receive scanning information from said landmark scanner;
      identify at least one landmark based on the received scanning information, wherein being configured to identify the at least one landmark comprises being configured to detect the at least one object in said received scanning information and match the at least one object against landmarks in a landmark database;
      determine a landmark-based position estimate based on the matched landmark;
      define a search space using the landmark-based position estimate; and
      reconstruct the work point for the satellite navigation device based on the defined search space.

2. The vehicle as defined in claim 1, wherein the controller is further configured to cause the vehicle to again operate in the first operating mode once the work point for the satellite navigation device has been reconstructed.

3. The vehicle as defined in claim 1, wherein the controller is configured to determine the landmark-based position estimate by:
   identifying at least three landmarks and determining the landmark-based position estimate based on a triangulation or trilateration of said at least three landmarks.

4. The vehicle as defined in claim 1, wherein the controller is configured to download new information about landmarks within a working area around the vehicle in response to the vehicle moving to new positions.

5. The vehicle as defined in claim 1, wherein the satellite navigation device is a Global Navigation Satellite System device.

6. The vehicle as defined in claim 5, wherein the satellite navigation device comprises a single-frequency carrier phase differential satellite signal receiver.

7. The vehicle as defined in claim 6, wherein the controller is configured to recalibrate the satellite navigation device based on the defined search space by resolving an integer wavelength ambiguity for satellite signals received by the satellite navigation device.

8. The vehicle as defined in claim 1, wherein the controller is configured, in the second operating mode, to define the search space by:
obtaining a pseudo range position estimate from satellite signals received by the satellite navigation device;
determining a coarse search space candidate from the pseudo range position estimate; and
defining the search space by reducing a scope of the coarse search space candidate based on the landmark-based position estimate.

9. The vehicle as defined in claim 7, wherein the controller is configured, in the second operating mode, to:
estimate whether the defined search space will allow integer wavelength ambiguity resolution within a threshold time; and if so:
continue in the second operation mode at least for the duration of the threshold time; and if not:
stop an ongoing propulsion of the vehicle.

10. The vehicle as defined in claim 1, wherein the controller is configured to store the landmark database in memory of the vehicle.

11. The vehicle as defined in claim 1, wherein the controller is configured to query the landmark database stored in an external memory.

12. The vehicle as defined in claim 1, wherein the landmark scanner is a camera, a laser, a radar, a sonar or an infra red sensor.

13. The vehicle as defined in claim 1, wherein the vehicle further comprises a deduced reckoning navigation sensor, and wherein the controller is further configured to:
obtain a deduced reckoning position estimate by the deduced reckoning navigation sensor and
define the search space using the deduced reckoning position estimate in combination with the landmark-based position estimate.

14. The vehicle as defined in claim 13, wherein the deduced reckoning navigation sensor is adapted to detect one or more of the following navigation parameters: position, speed, direction, tilt angle, and acceleration.

15. The vehicle as defined in claim 1, the controller further being configured to:
measure a duration of the second operation mode;
determine whether a threshold time has been exceeded; and if so:
stop an ongoing propulsion of the vehicle.

16. The vehicle of claim 1, wherein the vehicle is movably operated within a work area.

17. The vehicle of claim 1, wherein the vehicle is a guided farming vehicle, a robotic work tool or a robotic lawnmower.

18. A robotic work tool system comprising a charging station and a robotic work tool according to claim 17.

19. A method of controlling a vehicle for movable operation, the method comprising:
movably operating the vehicle in a first operating mode, the first operating mode being based on positions determined from satellite signals received by a satellite navigation device;
determining that a position cannot be reliably determined based on satellite signals received by the satellite navigation device;
in response thereto, movably operating the vehicle in the second operating mode, wherein movably operating in the second operating mode comprises:
receiving scanning information from said landmark scanner;
identifying at least one landmark based on the received scanning information, wherein identifying the at least one landmark comprises detecting the at least one object in said received scanning information and matching the at least one object against landmarks in a landmark database;
determining a landmark-based position estimate based on the matched landmark;
defining a search space using the landmark-based position estimate; and
reconstructing the work space for the satellite navigation device based on the defined search space.

20. A computer readable storage medium encoded with instructions that, when executed on a processor, perform the method according to claim 19.

* * * * *